United States Patent
Park et al.

(10) Patent No.: US 10,797,409 B2
(45) Date of Patent: *Oct. 6, 2020

(54) ANTENNA DEVICE AND ELECTRONIC DEVICE INCLUDING THE SAME

(71) Applicant: Samsung Electronics Co., Ltd., Suwon-si, Gyeonggi-do (KR)

(72) Inventors: Jungmin Park, Seoul (KR); Byungchul Kim, Yongin-si (KR); Hyunjin Kim, Seoul (KR); Kwanghyun Baek, Hwaseong-si (KR); Youngju Lee, Seoul (KR); Jinsu Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,919

(22) Filed: Aug. 12, 2019

(65) Prior Publication Data

US 2019/0363458 A1 Nov. 28, 2019

Related U.S. Application Data

(63) Continuation of application No. 15/671,623, filed on Aug. 8, 2017, now Pat. No. 10,381,749.

(30) Foreign Application Priority Data

Aug. 10, 2016 (KR) .......................... 10-2016-0101852

(51) Int. Cl.
*H01Q 21/29* (2006.01)
*H01Q 1/36* (2006.01)
(Continued)

(52) U.S. Cl.
CPC ........... *H01Q 21/29* (2013.01); *H01Q 1/2275* (2013.01); *H01Q 1/36* (2013.01); *H01Q 1/38* (2013.01);
(Continued)

(58) Field of Classification Search
CPC ....................................................... H01Q 21/29
(Continued)

(56) References Cited

U.S. PATENT DOCUMENTS 5,940,041 A 8/1999 Koyama et al.
8,760,352 B2 6/2014 Rao et al.
(Continued)

FOREIGN PATENT DOCUMENTS

JP 2013-162452 A 8/2013

OTHER PUBLICATIONS

Extended European Search Report dated Jun. 19, 2019, issued in a counterpart European application No. 17839771.7-1205/3482458.
(Continued)

*Primary Examiner* — Peguy Jean Pierre
(74) *Attorney, Agent, or Firm* — Jefferson IP Law, LLP

(57) ABSTRACT

An antenna device for providing a higher data transmission rate in a wireless communication system is provided. The antenna device includes a first radiating body mounted to a side surface of a multiple layer circuit board to transmit and receive a wireless signal and a second radiating body mounted to a top surface of the multiple layer circuit board and electrically connected to the first radiating body to transmit and receive the wireless signal together with the first radiating body.

20 Claims, 12 Drawing Sheets

(51) Int. Cl.
*H01Q 1/38* (2006.01)
*H01Q 19/28* (2006.01)
*H01Q 21/24* (2006.01)
*H01Q 9/04* (2006.01)
*H01Q 1/22* (2006.01)
*H01Q 1/52* (2006.01)
*H01Q 15/14* (2006.01)
*H01Q 19/10* (2006.01)

(52) U.S. Cl.
CPC ........... *H01Q 1/528* (2013.01); *H01Q 9/0414* (2013.01); *H01Q 15/14* (2013.01); *H01Q 19/10* (2013.01); *H01Q 19/28* (2013.01); *H01Q 21/24* (2013.01)

(58) Field of Classification Search
USPC .................................................. 343/700 MS
See application file for complete search history.

(56) References Cited

U.S. PATENT DOCUMENTS

| | | | |
|---|---|---|---|
| 8,786,509 B2 | 7/2014 | Johnson | |
| 8,818,457 B2 | 8/2014 | Besoli et al. | |
| 8,993,996 B2 * | 3/2015 | Shur | H01L 33/06 257/13 |
| 9,331,389 B2 | 5/2016 | Anguera Pros et al. | |
| 2004/0166802 A1 * | 8/2004 | McKay, Sr. | H04B 7/15535 455/15 |
| 2005/0264451 A1 * | 12/2005 | Aikawa | H01Q 21/065 343/700 MS |
| 2011/0241969 A1 | 10/2011 | Zhang et al. | |
| 2011/0260939 A1 | 10/2011 | Korva et al. | |
| 2012/0139796 A1 * | 6/2012 | Park | H01Q 1/38 343/700 MS |
| 2012/0162022 A1 | 6/2012 | Wei | |
| 2012/0235867 A1 | 9/2012 | Kim et al. | |
| 2013/0088404 A1 | 4/2013 | Ramachandran et al. | |
| 2013/0147664 A1 | 6/2013 | Lin | |
| 2013/0257672 A1 | 10/2013 | Lu et al. | |
| 2015/0194741 A1 | 7/2015 | Balbien et al. | |
| 2015/0349428 A1 | 12/2015 | Kashino et al. | |
| 2016/0043470 A1 | 2/2016 | Ko et al. | |
| 2016/0087348 A1 | 3/2016 | Ko et al. | |
| 2016/0190689 A1 | 6/2016 | Chi et al. | |
| 2017/0110797 A1 * | 4/2017 | Mentesana | H01Q 21/064 |
| 2018/0024226 A1 * | 1/2018 | Izadian | H01Q 21/0037 342/188 |

OTHER PUBLICATIONS

European Office Action dated Apr. 2, 2020, issued in a counterpart European Application No. 17 839 771.7-1205.

* cited by examiner

ANTENNA DEVICE AND ELECTRONIC DEVICE INCLUDING THE SAME

CROSS-REFERENCE TO RELATED APPLICATION(S)

This application is a continuation application of prior application Ser. No. 15/671,623, filed on Aug. 8, 2017, and was based on and claimed priority under 35 U.S.C. § 119(a) of a Korean patent application number 10-2016-0101852, filed on Aug. 10, 2016 in the Korean Intellectual Property Office, the disclosure of which is incorporated by reference herein in its entirety.

TECHNICAL FIELD

The present disclosure relates to an antenna device. More particularly, the present disclosure relates to a mixed polarized antenna device for providing a higher data transmission rate in a millimeter wave (mmWave) wireless communication system.

BACKGROUND

Efforts are being made to develop an enhanced fifth generation (5G) communication system or a pre-5G communication system in order to satisfy an increase in demand for wireless data traffic as a fourth generation (4G) communication system is now commercially available. Therefore, a 5G communication system or a pre-5G communication system is referred to as a Beyond 4G Network communication system or a post long term evolution (LTE) system.

In order to achieve a high data transmission rate, consideration is being given to implementing the 5G communication system in a millimeter wave (mmWave) band (e.g., 60 GHz band). In order to mitigate any transmission loss in a millimeter wave (mmWave) band and transmission distance, the technologies of beamforming, massive multiple input and output (MIMO), full dimensional MIMO (FD-MIMO), array antenna, analog beamforming, and large scale antenna have been discussed for the 5G communication system.

Further, to enhance networks in the 5G communication system, the technologies of innovative small cell, advanced small cell, cloud radio access network (cloud RAN), ultra-dense network, device to device (D2D) communication, wireless backhaul, moving network, cooperative communication, coordinated multi-points (CoMP), and reception interference cancellation have been developed.

In addition, hybrid frequency shift keying (FSK) and Quadrature amplitude modulation (QAM) (FQAM) and sliding window superposition coding (SWSC), which are advanced coding modulation (ACM) methods, filter bank multi carrier (FBMC), non-orthogonal multiple access (NOMA), and sparse code multiple access (SCMA), which are advanced access technologies, have been developed for the 5G system.

Because a resonant frequency wavelength λ of an antenna device used in a mmWave band having a frequency range 30-300 GHz is 1-10 mm, even if a length of a radiating body of the antenna device is relatively short, the antenna device may support a wireless communication system. For example, because the antenna device supporting the wireless communication system has a radiating body of a length 0.25-2.5 mm, which is about ¼ of the resonant frequency wavelength λ, the antenna device may provide a wireless communication service in a mmWave band.

When a frequency band increases, electronic waves are directional and have low diffraction (i.e., are not susceptible to multipath fading). As such, the antenna device used in a mmWave band may increase a loss due to an obstacle (e.g., a building, a wall, or terrain features). Therefore, the antenna device used in the mmWave band requires coverage of 360° and, for this reason, the electronic device may support coverage of 360° through a method of mounting at least a portion of the antenna device in a side portion of a multiple layer circuit board therein.

However, in the antenna device mounted in the side portion of the multiple layer circuit board, a horizontal polarized component of electronic waves may be relatively easily secured, but it is difficult to secure a vertical polarized component of electronic waves. This is because when a thickness of the multiple layer circuit board is about 1 mm, it is difficult to extend a radiating body length by 1 mm or more in a vertical direction.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mixed polarized antenna device that can easily secure a vertical polarized component of an antenna device while maintaining a thickness of a multiple layer circuit board in a millimeter wave (mmWave) band.

In accordance with an aspect of the present disclosure, an antenna device is provided. The antenna device includes a first radiating body mounted to a side surface of a multiple layer circuit board to transmit and receive a wireless signal, and a second radiating body mounted to a top surface of the multiple layer circuit board and electrically connected to the first radiating body to transmit and receive the wireless signal together with the first radiating body.

In accordance with another aspect of the present disclosure, an electronic device is provided. The electronic device a first antenna device comprising a first radiating body mounted to a first area of a side surface of a multiple layer circuit board to transmit and receive a wireless signal, and a second antenna device comprising a second radiating body mounted to a second area of the side surface of the multiple layer circuit and a third radiating body to transmit and receive the wireless signal together, wherein the third radiating body is mounted to a top surface of the multiple layer circuit board and is electrically connected to the second radiating body, and wherein the first antenna device and the second antenna device are alternately disposed in a horizontal direction of the multiple layer circuit board.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
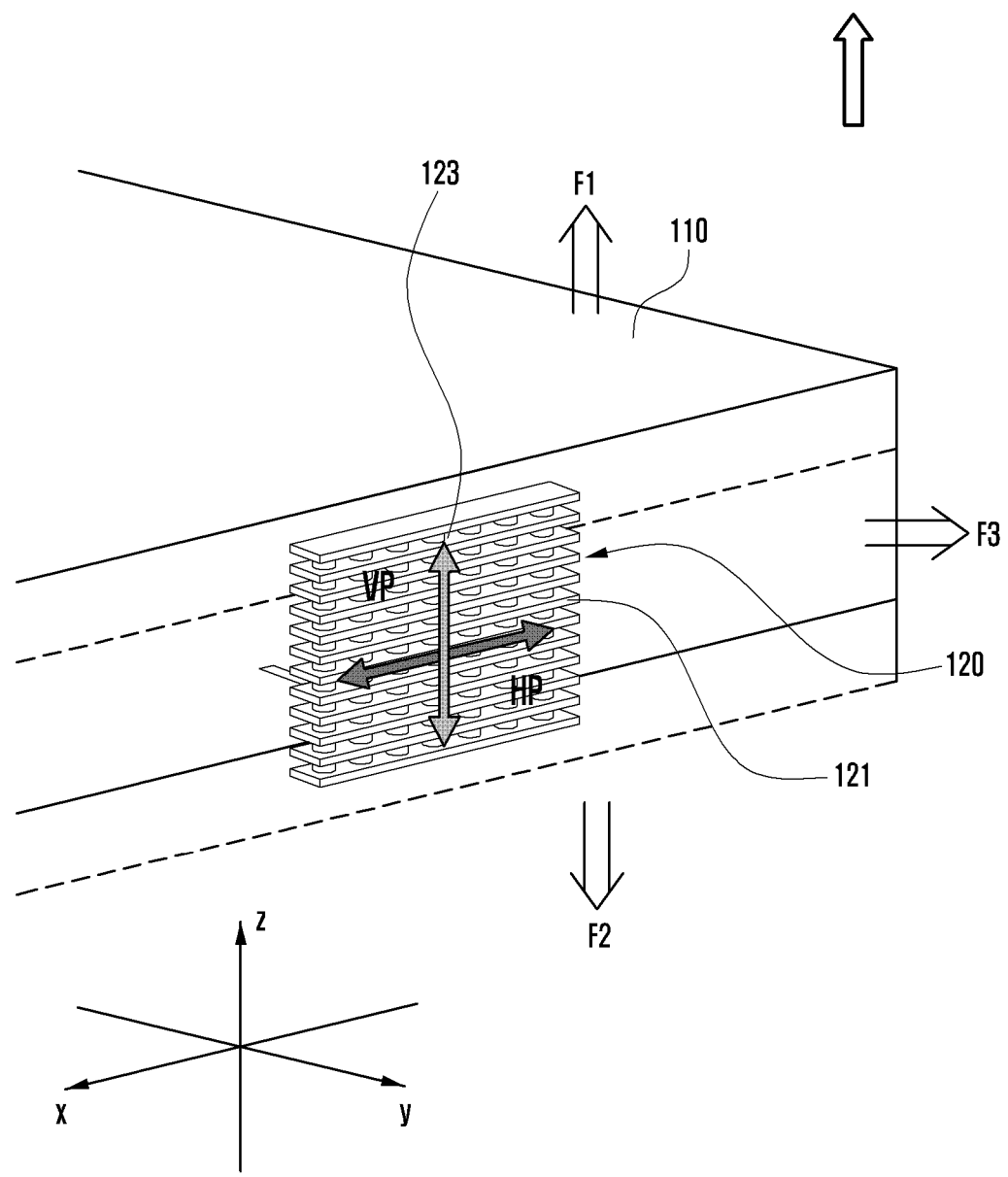
FIG. 1 is a diagram illustrating a radiating body according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expressions "have", "may have", "include", and "may include" refer to the existence of a corresponding feature (e.g., a numeral, a function, an operation, or an element such as a component), and do not exclude one or more additional features.

In the present disclosure, the expressions "A or B", "at least one of A and/or B", and "one or more of A and/or B" may include all possible combinations of the items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in various embodiments of the present disclosure may modify various components regardless of the order and/or the importance but is not intended to limit the corresponding components. For example, a first user device and a second user device indicate different user devices but are both user devices. For example, a first element may be referred to as a second element, and similarly, a second element may be referred to as a first element without departing from the scope of the present disclosure.

It should be understood that when an element (e.g., a first element) is referred to as being (operatively or communicatively) "connected," or "coupled," to another element (e.g., a second element), the element may be directly connected or coupled to the other element or another element (e.g., a third element) may be interposer between them. In contrast, it may be understood that when an element (e.g., a first element) is referred to as being "directly connected," or "directly coupled" to another element (e.g., a second element), there is no element (e.g., a third element) interposed between them.

The expression "configured to" used in the present disclosure may be interchangeably used with, for example, the expressions "suitable for", "having the capacity to", "designed to", "adapted to", "made to", and "capable of" according to the situation. The expression "configured to" may not necessarily imply "specifically designed to" in hardware. Alternatively, in some situations, the expression "device configured to" may indicate that the device, together with other devices or components, "is able to". For example, the expression "processor adapted (or configured) to perform A, B, and C" may indicate a dedicated processor (e.g. an embedded processor) for performing only the corresponding operations or a general-purpose processor (e.g., a central processing unit (CPU) or an application processor (AP)) that can perform the corresponding operations by executing one or more software programs stored in a memory device.

Unless defined otherwise, all terms used herein, have the same meanings as those commonly understood by a person skilled in the art to which the present disclosure pertains. Terms such as those defined in a generally used dictionary may be interpreted to have the same meanings as the contextual meanings in the relevant field of art, and are not intended to be interpreted to have ideal or excessively formal meanings unless clearly defined in the present disclosure. In some cases, even a term defined in the present disclosure is not intended to be interpreted to exclude embodiments of the present disclosure.

In the present disclosure, an electronic device may be a device that includes a communication function. For example, an electronic device may be a smart phone, a tablet personal computer (PC), a mobile phone, a video phone, an electronic (e-book) reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a portable medical device, a digital camera, or a wearable device (e.g., head-mounted device (HMD) such as electronic glasses, electronic clothes, an electronic bracelet, an electronic necklace, an electronic accessory, an electronic tattoo, a smart mirror, or a smart watch).

According to an embodiment of the present disclosure, an electronic device may be a smart home appliance that includes a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync®, Apple TV®, Google TV™, etc.), a game console, an electronic dictionary, an electronic key, a camcorder, or an electronic picture frame.

According to an embodiment of the present disclosure, an electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sales (POS) devices in a shop, or an Internet of things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to an embodiment of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

Hereinafter, an electronic device according to an embodiment of the present disclosure is described with reference to the accompanying drawings. As used herein, the term "user" may indicate a person who uses an electronic device or a device (e.g., an artificial intelligence electronic device) that uses an electronic device.

Further, the various embodiments of the present disclosure may be implemented in an advanced evolved universal terrestrial radio access (E-UTRA) (i.e., a long term evolution-advanced (LTE-A)) system that supports carrier aggregation but the subject matter of the present disclosure may also be applied to other communication systems without departing from the scope of the present disclosure. For example, the subject matter of the present disclosure may be applied even to multicarrier high speed packet access (HSPA) that supports carrier wave coupling.

When describing an embodiment in this specification, a description of technical contents well known in the art of the present disclosure and not directly related to the present disclosure will be omitted. This is to clearly describe the subject matter of the present disclosure without obscuring the subject matter by omitting any unnecessary description.

Similarly, in the attached drawings, some constituent elements are shown in an exaggerated or schematic form or are omitted. Further, a size of each constituent element does not entirely reflect an actual size. Like reference numerals designate like elements in the drawings.

These advantages and features of the present disclosure and a method of accomplishing them will become more readily apparent from the detailed description given hereinafter together with the accompanying drawings. However, the present disclosure is not limited to the following embodiments, and it may be implemented in different forms. The present embodiments enable the complete disclosure of the present disclosure and are provided to enable complete knowledge of the scope of the disclosure to those skilled in the art, and the present disclosure is defined by the scope of the claims.

Herein, it may be understood that each block of a flowchart and combinations of the flowchart may be performed by computer program instructions. Because these computer program instructions may be mounted in a processor of a universal computer, a special computer, or other programmable data processing equipment, the instructions performed through a processor of a computer or other programmable data processing equipment generate a means that performs functions described in a block(s) of the flowchart. In order to implement a function with a specific method, because these computer program instructions may be stored at a computer available or computer readable memory that can direct a computer or other programmable data processing equipment, instructions stored at the computer available or computer readable memory may produce a production item including an instruction means that performs a function described in block(s) of the flowchart. Because computer program instructions may be mounted on a computer or other programmable data processing equipment, a series of operations are performed on the computer or other programmable data processing equipment and generate a process executed with the computer, and instructions that direct the computer or other programmable data processing equipment may provide operations for executing functions described in block(s) of the flowchart.

Further, each block may represent a portion of a module, segment, or code including at least one executable instruction for executing a specific logical function(s). Further, in several replaceable execution examples, it should be noted that functions described in blocks may be performed regardless of order. For example, two consecutively shown blocks may be substantially simultaneously performed or may be sometimes performed in reverse order according to a corresponding function.

The term "unit" used in the present embodiment means a software or hardware component such as a field programmable gate array (FPGA) or an application specific integrated circuit (ASIC) that performs any function. However, any described "unit" is not limited to software or hardware. A "unit" may be configured to store at a storage medium that can address and may be configured to reproduce at least one processor. Therefore, "unit" includes, for example, components (such as software components, object-oriented software components, class components, and task components), processes, functions, attributes, procedures, subroutines, segments of a program code, drivers, firmware, microcode, circuit, data, database, data structures, tables, arrays, and variables. A function provided within constituent elements and "units" may be performed by coupling the smaller number of constituent elements and "units" or by subdividing the constituent elements and "units" into additional constituent elements and "units". Further, constituent elements and "units" may be implemented in a manner to provide at least one CPU within a device or a security multimedia card.

FIG. 1 is a diagram illustrating a radiating body according to various embodiments of the present disclosure.

Referring to FIG. 1, a multiple layer circuit board 110 may be configured by layering at least one printed circuit board (PCB). The multiple layer circuit board 110 may include a first surface F1 in which several electronic components and a circuit wiring are formed and a second surface F2 facing in a direction opposite to that of the first surface. The multiple layer circuit board 110 may include a side surface F3 that encloses at least a partial space between the first surface and the second surface. Hereinafter, a "first surface", "second surface", and "side surface" described in this document may be defined as a top surface F1, a bottom surface F2, and side surface F3, respectively, of the multiple layer circuit board 110. Hereinafter, a length (or planar) direction extends on an x-y plane in a side surface of the multiple layer circuit board 110 described in this document and may be referred to as a "horizontal direction", and a length direction extends in a z-axis direction that is normal to an x-y plane and may be referred to as a "vertical direction".

According to various embodiments, an antenna device may include a first radiating body 120 to receive a power supply signal to transmit and receive a wireless signal. Such a first radiating body may perform maximum emission through at least a portion of the side surface F3.

According to various embodiments, the first radiating body 120 may include a mesh grid radiating body in which at least a portion of the side surface F3 of the multiple layer circuit board 110 is configured in a via coupling form. The mesh grid radiating body may be configured by arranging a plurality of patches 121 and vias 123 in a net form. The plurality of patches 121 are arranged at each layer forming the multiple layer circuit board 110, and patches 121 of adjacent layers are connected through the vias 123 to enable the first radiating body 120 to operate as an antenna.

According to various embodiments, a size (e.g., a vertical or horizontal length) of the first radiating body 120 may be determined according to a resonant frequency and a power supply position. A horizontal polarized antenna device that extends in a horizontal direction from the side surface F3 of the multiple layer circuit board 110 may be implemented, but it is difficult to implement a vertical polarized antenna device that extends in a vertical direction from the side surface F3.

Figure 2A:
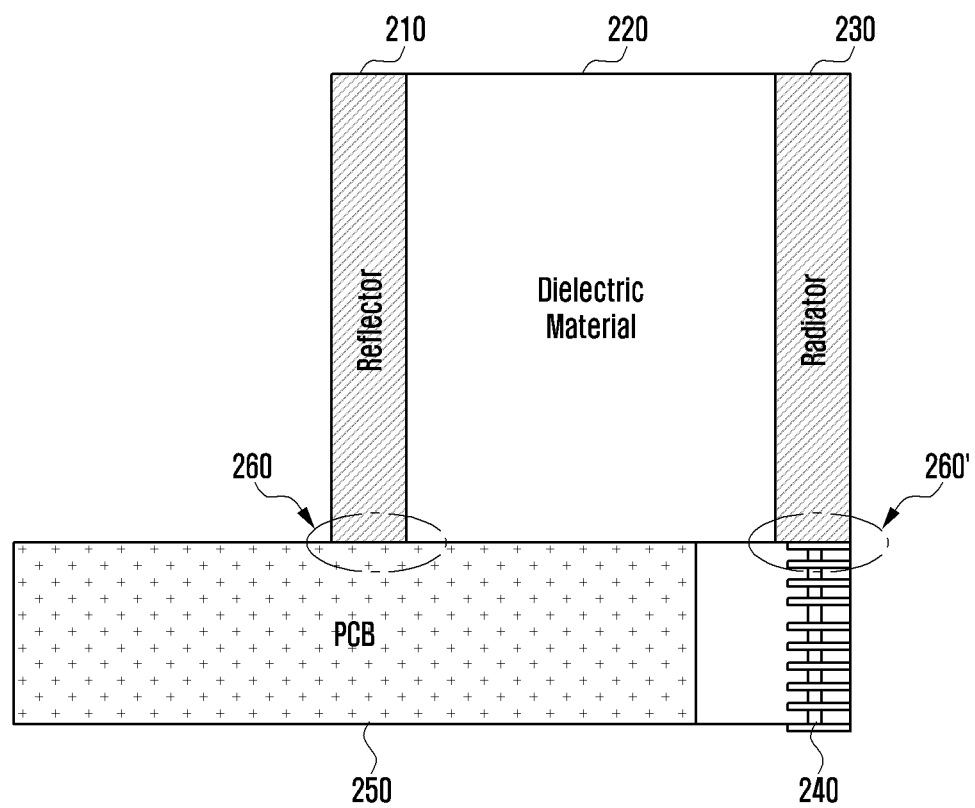
FIG. 2A is a side view illustrating an antenna device according to various embodiments of the present disclosure.
Figure 2B:
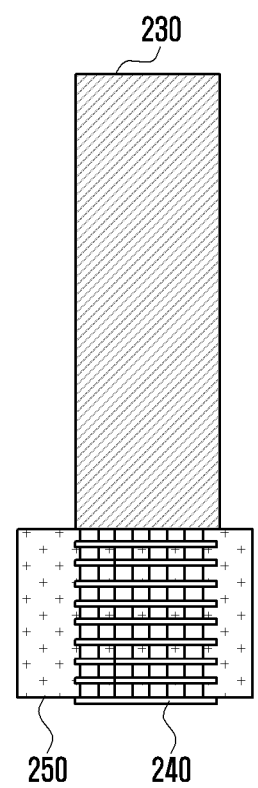
FIG. 2B is a front view illustrating an antenna device according to various embodiments of the present disclosure.

FIG. 2A is a side view illustrating an antenna device according to various embodiments of the present disclosure and FIG. 2B is a front view illustrating an antenna device according to various embodiments of the present disclosure.

Referring to FIGS. 2A and 2B, the antenna device may include the radiating body of FIG. 1. For example, the antenna device may include a first radiating body 240 in which at least a portion of a side surface of the multiple layer circuit board receives a power supply signal to transmit and receive a wireless signal. Further, the first radiating body 240 may include a mesh grid radiating body in which at least a portion of at least one side surface of the multiple layer circuit board is configured in a via coupling form.

A polarized antenna device according to various embodiments may further include a second radiating body mounted on at least one surface of the multiple layer circuit board and electrically connected to the first radiating body 240 to transmit and receive a wireless signal together with the first radiating body 240.

According to various embodiments, the second radiating body may include at least one of a radiator 230, dielectric material 220, and reflector 210. In an embodiment, the second radiating body may omit at least one of the constituent elements or may additionally have another constituent element.

According to various embodiments, the radiator 230 may be bonded to the first radiating body and extend in a vertical direction with respect to the multiple layer circuit board. Therefore, the radiator 230 together with the first radiating body 240 may enable a vertical polarized component that cannot be securely fastened by a conventional antenna device.

A length of the radiator 230 may be determined according to a resonant frequency and a power supply position.

According to various embodiments, the second radiating body may include a reflector 210 that extends in an opposite direction with respect to the radiator 230 to reflect electronic waves from the radiator 230. The reflector 210 may improve directivity while reinforcing a vertical polarized component of electronic waves emitted from the radiator 230. For example, the reflector 210 may be positioned in a reverse direction with respect to a direction of the radiator 230. Further, the reflector 210 is substantially parallel to the radiator 230 and a length of the reflector 210 may be longer than or equal to that of the radiator 230. When a portion of electronic waves emitted from the radiator 230 is emitted in a reverse direction, the reflector 210 reflects these electronic waves and causes the reflected wave to be emitted in a forward direction.

The polarized antenna device according to various embodiments may include a dielectric material 220 at least partially disposed between the radiator 230 and the reflector 210. The dielectric material 220 may include a material in which a direct current (DC) current does not flow and that can insulate the radiator 230 and the reflector 210. For example, the dielectric material 220 may include various dielectric materials such as poly sterol, ferrite, or an epoxy resin having a large dielectric constant. According to various embodiments, a gap between the radiator 230 and the reflector 210 may be determined according to a dielectric constant of a material included in the dielectric material. The dielectric material 220 may prevent the radiator 230 and the reflector 210 from being electrically connected and may enable use of antenna resonance and various frequency bands.

The reflector 210 may be fastened to a top surface of the multiple layer circuit board 250 at reference numeral 260. A top conductive element of the first radiating body 240 may be planar with respect to a top surface of the multiple layer circuit board 250 and the radiator may be electrically coupled to the top conductive element as illustrated at reference numeral 260'.

According to various embodiments, a multiple layer circuit board 250 may be configured by layering at least one PCB. The multiple layer circuit board 250 may include a first surface (e.g., a first surface F1) in which several electronic components and a circuit wiring are formed and a second surface (e.g., a second surface F2) facing in a direction opposite to that of the first surface. The multiple layer circuit board 250 may include a side surface (e.g., a side surface F3) that encloses at least a partial space between the first surface and the second surface.

Figure 3:
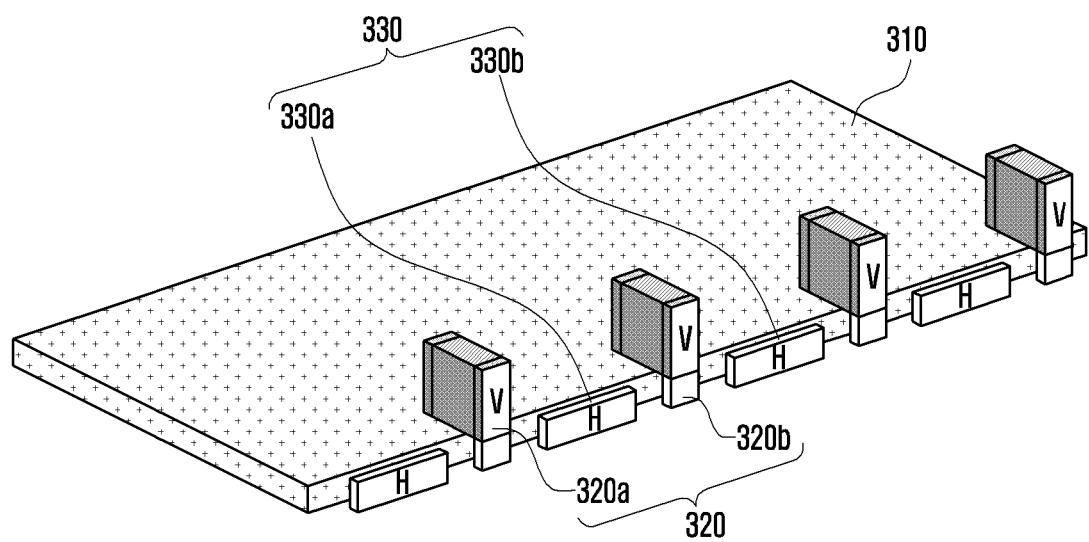
FIG. 3 is a perspective view illustrating a multiple input multiple output (MIMO) array antenna system according to various embodiments of the present disclosure.

FIG. 3 is a perspective view illustrating a multiple input multiple output (MIMO) array antenna system according to various embodiments of the present disclosure.

Referring to FIG. 3, the MIMO array antenna system may arrange a plurality of antenna devices to perform a multiple input and output operation and may be used for improving a data transmission speed or range. In general, to implement the MIMO antenna, a plurality of antenna elements having the same performance may be used. However, when arranging a plurality of antenna devices within a limited space, an electric distance between antenna devices is extremely limited, and interference by a current and emission between antenna devices occurs.

Referring to FIG. 3, by alternately disposing antenna devices that emit a vertical polarized component and antenna devices that emit a horizontal polarized component, mutual interference can be reduced between antenna devices having the same performance. An MIMO array antenna system according to various embodiments may be disposed with an interleaved array method of alternately disposing horizontal antenna devices and vertical antenna devices.

Referring to FIG. 3, a multiple layer circuit board 310 includes a vertical polarized antenna device and a horizontal polarized antenna device disposed as 1×4 interleaved array antennas, but the number of antenna devices may be adjusted in consideration of a gain value and a radiation radius and is not limited to the example of FIG. 3.

In an MIMO array antenna system of an interleaved array method, to effectively suppress mutual interference between antenna devices having the same performance, radiating bodies of horizontal polarized antenna devices 330 and radiating bodies of vertical polarized antenna devices 320 should form a right angle. It is also preferable that the horizontal polarized antenna devices 330 and the vertical polarized antenna devices 320 are alternately disposed in a side length direction of the multiple layer circuit board to reduce interference. For example, when disposing the horizontal polarized antenna device 330 between a vertical polarized antenna device 320a and another vertical polarized antenna device 320b, mutual interference between vertical polarized antenna devices 320 may be reduced. Similarly, by disposing the vertical polarized antenna device 320 between a horizontal polarized antenna device 330a and another horizontal polarized antenna device 330b, mutual interference between horizontal polarized antenna devices 330 may be reduced.

Figure 4A:
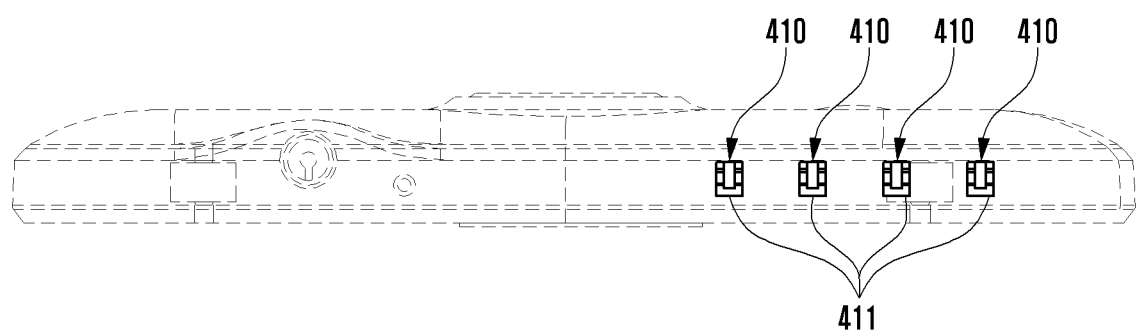
FIG. 4A is a view illustrating an electronic device including an antenna device according to various embodiments of the present disclosure.

FIG. 4A is a view illustrating an electronic device including an antenna device according to various embodiments of the present disclosure.

Referring to FIG. 4A, an antenna device 410 may be disposed in at least a portion of a side surface of a multiple layer circuit board within the electronic device. The antenna device 410 according to various embodiments may include a plurality of radiators 411 such that electronic waves are emitted to the maximum toward at least a portion of a direction facing a side surface of the electronic device.

Although not shown in FIG. 4A, the antenna device 410 may be configured to be at least partially exposed at the outside of a housing of the electronic device. For example, when the housing of the electronic device is made of a metal material, electronic waves emitted from the inside to the outside of the electronic device may be disturbed by the housing of the electronic device. Therefore, by exposing at least a portion of the radiator 411 to the outside of the housing of the electronic device and by separating at least a portion of the radiator 411 from a peripheral metal material, the antenna device 410 may efficiently emit electronic waves without disturbance from the housing of the electronic device. Further, to provide a strong external integral body, a removed portions of the metal housing may be filled with a dielectric material and post-processed with a metal color.

Figure 4B:
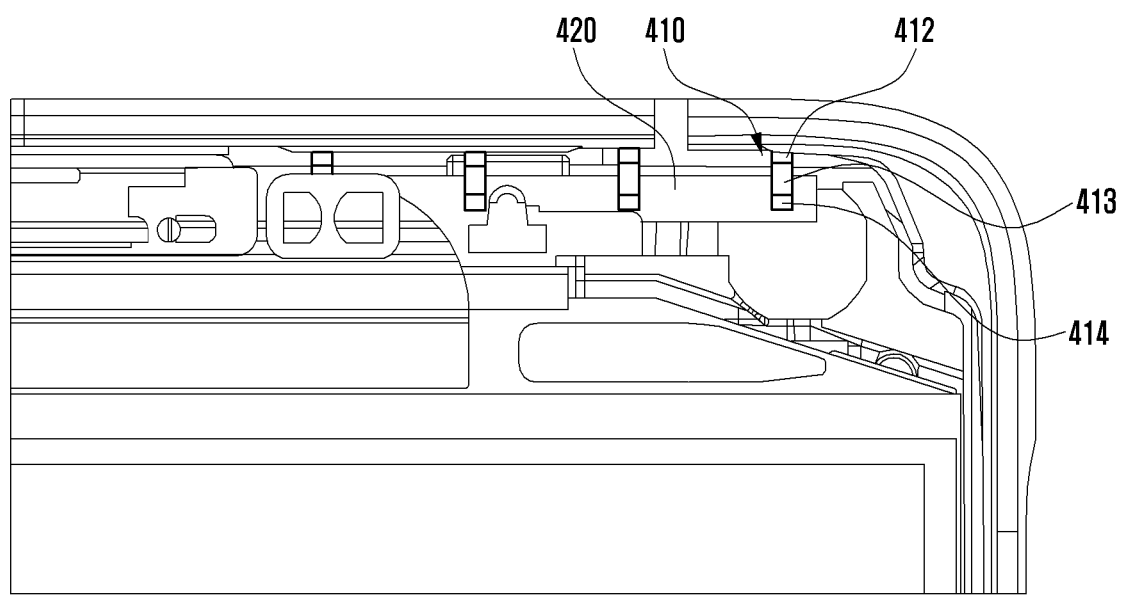
FIG. 4B is a view illustrating an internal configuration of an electronic device that mounts an antenna device according to various embodiments of the present disclosure.

FIG. 4B is a diagram illustrating an internal configuration of an electronic device that mounts an antenna device according to various embodiments of the present disclosure.

Referring to FIG. 4B, the antenna device 410 may be mounted in at least a portion of a multiple layer circuit board 420. A radiator 412 may be disposed in a direction to emit electronic waves, and a reflector 414 may be disposed in a reverse direction to emit electronic waves that reflected during transmission. In at least a partial space between the radiator 412 and the reflector 414, a dielectric material 413 may be formed.

FIGS. 5, 6, 7, and 8 are diagrams illustrating an antenna device according to various embodiments of the present disclosure.

Figure 5:
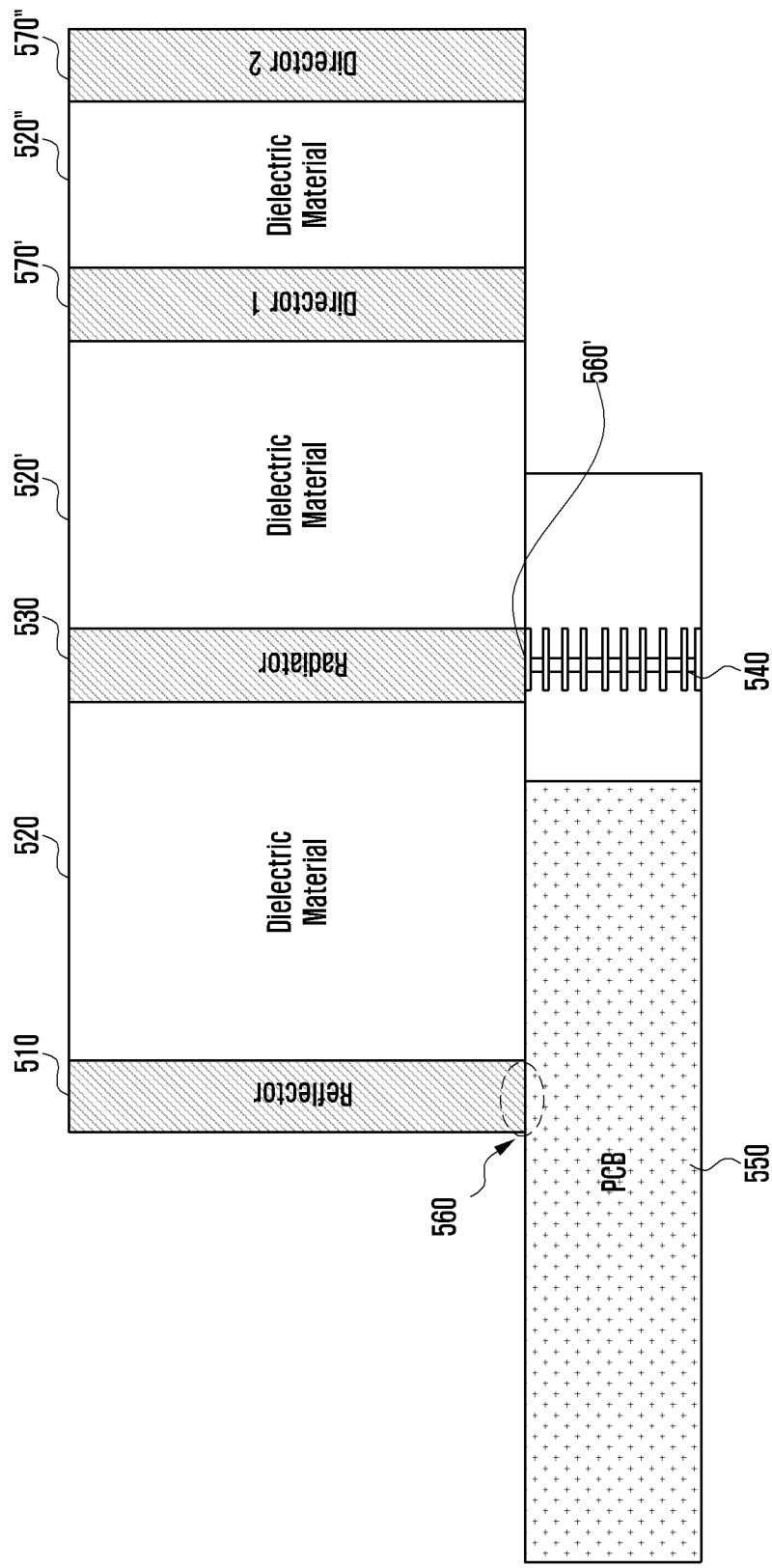
FIGS. 5, 6, 7, and 8 are diagrams illustrating an antenna device according to various embodiments of the present disclosure.

Referring to FIG. 5, an antenna device according to various embodiments may include at least one of a first radiating body 540, a radiator 530, a dielectric material 520, a reflector 510, and directors 570' and 570" that are at least partially mounted on a multiple layer circuit board 550.

The directors 570' and 570" according to various embodiments can improve directivity while reinforcing a vertical polarized component of emitted electronic waves. Further, as the number of directors increases, directivity can be further improved.

The directors 570' and 570" of FIG. 5 may be arranged in a direction to emit electronic waves. The directors 570' and 570" are extended parallel to the radiator 530, and a length thereof may be smaller than or equal to that of the radiator 530. As the directors 570' and 570" have a length smaller than or equal to that of the radiator 530, electronic waves emitted from the radiator 530 may induce a surface current to the directors 570' and 570". Thereby, the antenna device can further improve directivity while reinforcing a vertical polarized component.

The antenna device according to various embodiments may include a dielectric material 520' in at least a partial space between the director 570' and the radiator 530. Further, a dielectric material 520" may be formed in even at least a partial space between the director 570' and another director 570'. The dielectric materials 520' and 520" may perform the same function as that of the dielectric material 520 included in at least a partial space between the radiator 530 and the reflector 510; therefore, a detailed description thereof will be omitted.

Although not shown, the dielectric material 520" between the director 570" and the radiator 530 may be omitted.

The reflector 510 may be fastened to a top surface of the multiple layer circuit board 550 at reference numeral 560. A top conductive element of the first radiating body 540 may be planar with respect to a top surface of the multiple layer circuit board 550 and the radiator 530 may be electrically coupled to the top conductive element at illustrated at reference numeral 560'. As illustrated in FIG. 5, the radiating body 540 does not have to be adjacent to a side of the multiple layer circuit board 550, and a second radiating body formed via the reflector 510, dielectric materials 520, 520' and 520", and radiator 530, and directors 570' and 570" can extend beyond an edge of the multiple layer circuit board 550.

Figure 6:
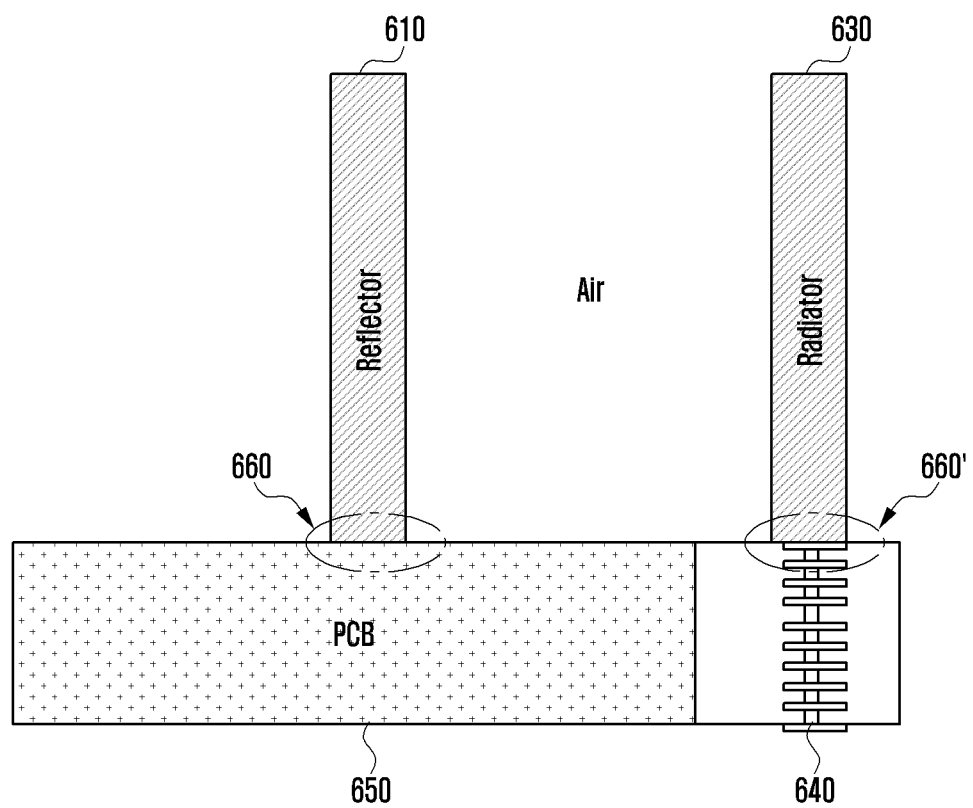

Referring to FIG. 6, an antenna device according to various embodiments may include at least one of a first radiating body 640, a radiator 630 mounted at reference numeral 660', and a reflector 610 mounted at reference numeral 660' on a multiple layer circuit board 650.

Figure 7:
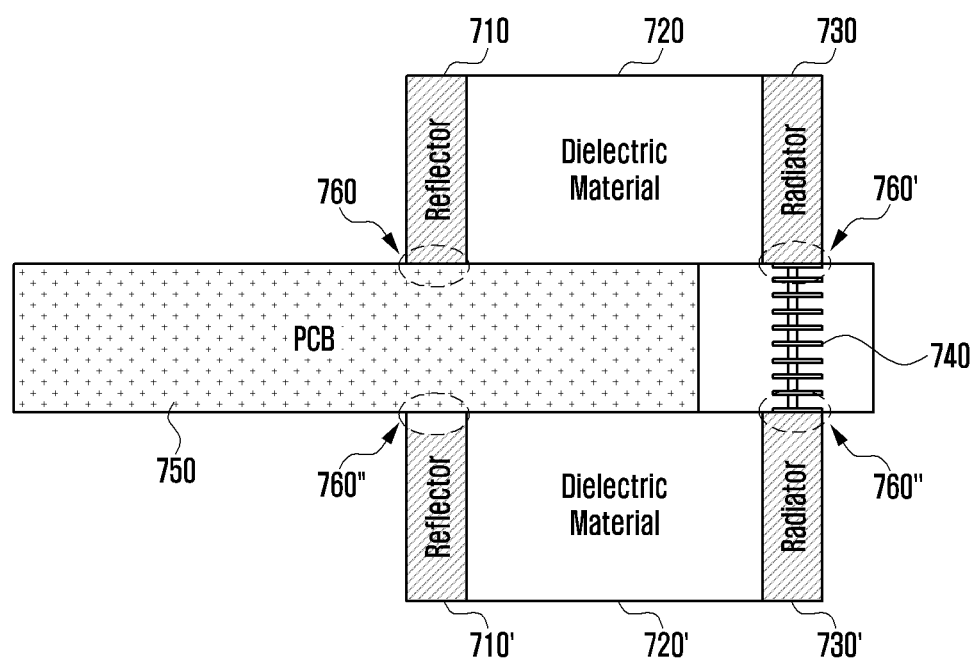

Referring to FIG. 7, an antenna device according to various embodiments may include at least one of a first radiating body 740, a radiator 730 mounted at reference numeral 760', a radiator 730' mounted at reference numeral 760", dielectric materials 720 and 720', a reflector 710 mounted at reference numeral 760, and a reflector 710' mounted at reference numeral 760''' on a multiple layer circuit board 750.

According to various embodiments, the radiators 730 and 730' may be at least partially bonded to the first radiating body 740 and may be extended in at least another direction of a vertical direction of the multiple layer circuit board from the bonded position. The radiators 730 and 730' each may be configured to transmit and receive a wireless signal together with the first radiating body 740.

Reflectors 710 and 710' may be positioned in a reverse direction of a direction to emit electronic waves from each of the radiators 730 and 730' disposed at the same surface. When a portion of electronic waves emitted from each of the radiators 730 and 730' is reflected, the reflectors 710 and 710' reflect and emit these electronic waves.

According to various embodiments, the dielectric materials 720 and 720' may be formed in at least a partial space between the radiators 730 and 730' and the reflectors 710 and 710'. The dielectric materials 720 and 720' may prevent the radiators 730 and 730' and the reflectors 710 and 710' from being electrically connected and enable use of antenna resonance and various frequency bands.

Figure 8:
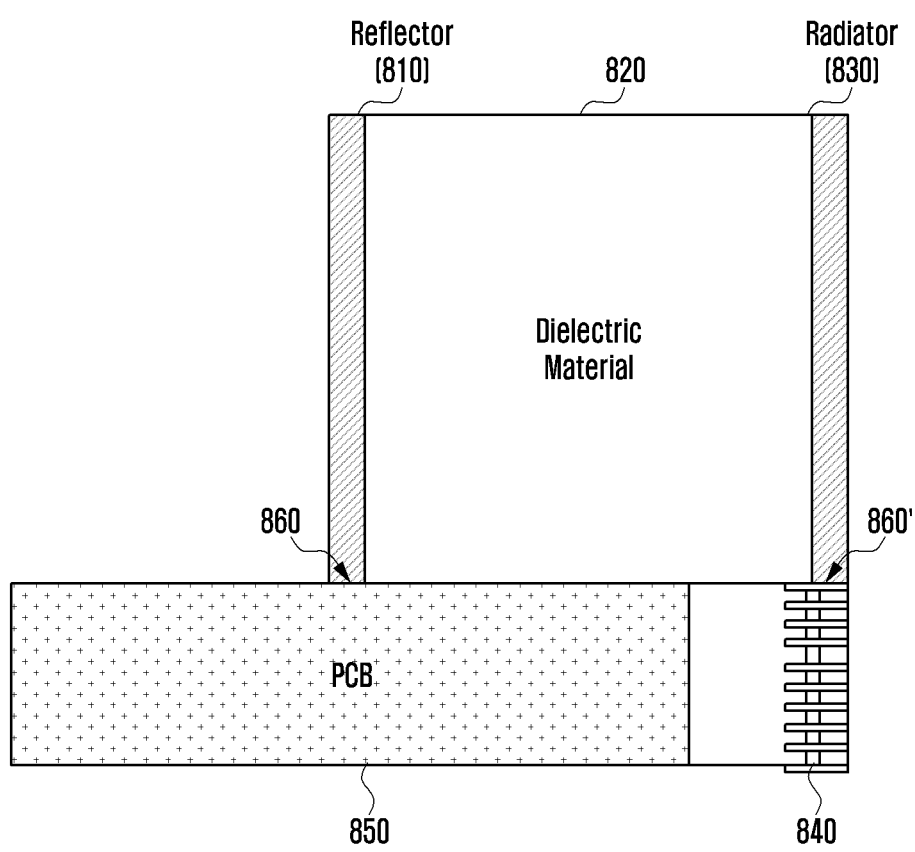

Referring to FIG. 8, an antenna device according to various embodiments may include at least one of a first radiating body 840, a radiator 830 mounted at reference numeral 860', a dielectric material 820, and a reflector 810 mounted at reference numeral 860 on a multiple layer circuit board 850.

In various embodiments described with reference to FIG. 8, the reflector 810 and the radiator 830 are plated with a metal. A method of plating the both end portions 810 and 830 of the dielectric material 820 may include various methods such as electro plating, chemical plating, spray, and vacuum deposition.

Figure 9:
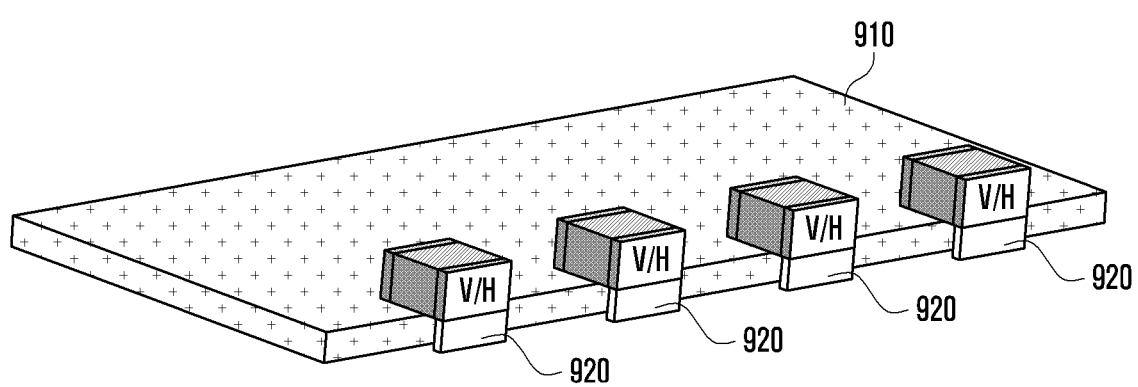
FIGS. 9 and 10 are perspective views illustrating an antenna device according to various embodiments of the present disclosure.
Figure 10:
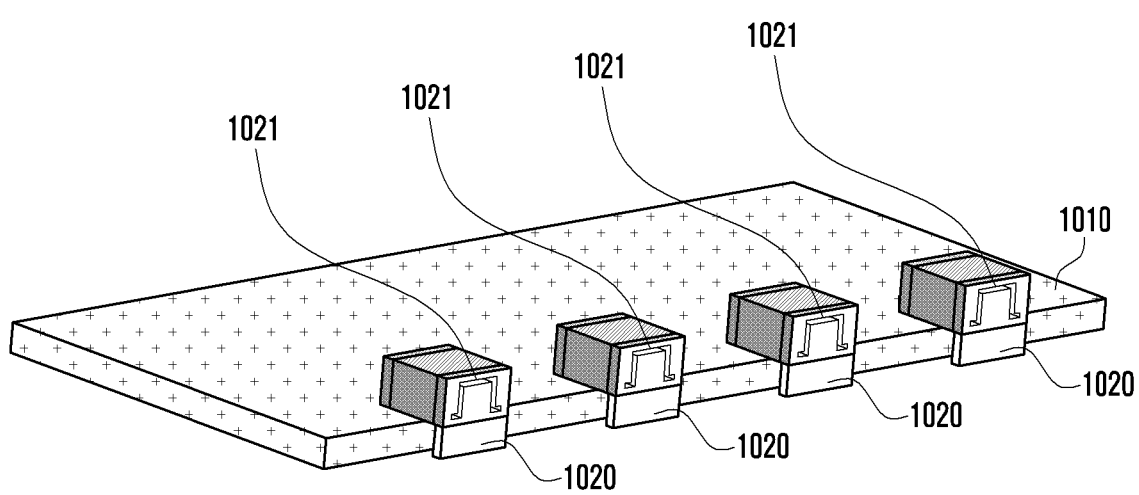

FIGS. 9 and 10 are perspective views illustrating an antenna device according to various embodiments of the present disclosure.

Referring to FIG. 9, a multiple layer circuit board 910 may include an antenna device 920 to emit a horizontal polarized component and a vertical polarized component. The antenna device 920 may operate as a vertical/horizontal mixing polarized antenna device.

Referring to FIG. 10, a multiple layer circuit board 1010 may include an antenna device 1020 according to various embodiments of the present disclosure may include a slit 1021. When the antenna device 1020 includes the slit 1021, the antenna device 1020 may provide a mobile communication service of a low frequency band using the small size of antenna device 1020. Technology that supports a low frequency band by including a slit in the antenna device will become apparent to a person of ordinary skill in the art and, therefore, a detailed description thereof will be omitted.

An antenna device according to various embodiments of the present disclosure may include an electronic device that includes a first radiating body in which at least a portion of a side surface of a multiple layer circuit board receives a power supply signal to transmit and receive a wireless signal and a second radiating body mounted in at least one surface of the multiple layer circuit board and electrically connected to the first radiating body to transmit and receive a wireless signal together with the first radiating body.

The first radiating body may include a mesh grid radiating body in which at least a portion of at least one side surface of the multiple layer circuit board is configured in a via coupling form.

The second radiating body may include a radiator at least partially bonded to the first radiating body and extended in at least one direction of a side thickness direction of the multiple layer circuit board from the bonded position.

According to various embodiments of the present disclosure, the sum of a vertical length of the first radiating body and a vertical length of the radiator may be ¼ or more of a resonant frequency wavelength λ.

The polarized antenna device according to various embodiments of the present disclosure may further include a reflector disposed in a reverse direction of a direction to emit electronic waves from the radiator and extended in an extended direction of the radiator.

The reflector of the polarized antenna device according to various embodiments of the present disclosure may be extended at least longer than the radiator.

The reflector of the polarized antenna device according to various embodiments of the present disclosure may be disposed at a position separated by a distance corresponding to ¼ of a resonant frequency wavelength λ from the radiator.

The polarized antenna device according to various embodiments of the present disclosure may further include a dielectric material in at least a partial space between the radiator and the reflector.

In the polarized antenna device according to various embodiments of the present disclosure, a separation distance between the reflector and the radiator may be determined based on a dielectric constant of a material included in the dielectric material.

The polarized antenna device according to various embodiments of the present disclosure may further include at least one director arranged in a direction to emit electronic waves from the radiator and extended in an extended direction of the radiator.

In the polarized antenna device according to various embodiments of the present disclosure, the at least one director may be extended by a length at least smaller than the radiator.

The polarized antenna device according to various embodiments of the present disclosure may further include a third radiating body mounted in the at least one surface of the multiple layer circuit board in which the second radiating body is mounted and at least another one surface facing in a direction opposite to that of the at least one surface and electrically connected to the first radiating body to transmit and receive a wireless signal together with the first radiating body and the second radiating body.

In the polarized antenna device according to various embodiments of the present disclosure, the second radiating body may include a dielectric material, and both end portions of the dielectric material may be plated with a metal.

In the polarized antenna device according to various embodiments of the present disclosure, the first radiating body may be extended by a distance corresponding to ¼ or more of at least resonant frequency wavelength λ in a direction horizontal to an upper surface or a lower surface of the multiple layer circuit board.

An electronic device according to various embodiments of the present disclosure includes a first antenna device including a first radiating body in which at least a portion of a side surface of a multiple layer circuit board receives a power supply signal to transmit and receive a wireless signal and a second antenna device including another first radiating body and a second radiating body that transmits and receives a wireless signal together with the another first radiating body, wherein the second radiating body is mounted in at least one surface of the multiple layer circuit board and is electrically connected to the another first radiating body, and wherein the first antenna device and the second antenna device are alternately disposed in a side length direction of the multiple layer circuit board.

According to various embodiments of the present disclosure, a polarized antenna device can be provided that can easily secure a polarized component of an antenna device while maintaining a thickness of a multiple layer circuit board.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An antenna device comprising:
   a radiating body mounted to two adjacent surfaces of a multiple layer circuit board to transmit and receive both a first polarized wireless signal and a second polarized wireless signal,
   wherein the first polarized wireless signal and the second polarized wireless signal are different.

2. The antenna device of claim 1,
   wherein the radiating body includes a first radiating body and a second radiating body,
   wherein the first radiating body is mounted to a side surface of the multiple layer circuit board, the first radiating body configured to transmit and receive the first polarized wireless signal, and
   wherein the second radiating body is mounted to a top surface of the multiple layer circuit board and electrically connected to the first radiating body, the second radiating body configured to transmit and receive the second polarized wireless signal together with the first radiating body.

3. The antenna device of claim 2,
   wherein the second radiating body comprises a radiator coupled to the first radiating body, and
   wherein the second radiating body extends in a direction that is perpendicular to a direction in which the multiple layer circuit board is disposed.

4. The antenna device of claim 3, wherein the second radiating body comprises a reflector located in a direction opposite of the radiator.

5. The antenna device of claim 4, wherein the second radiating body further comprises a dielectric material disposed between the radiator and the reflector.

6. The antenna device of claim 5, wherein a separation distance between the reflector and the radiator is determined based on a dielectric constant of the dielectric material.

7. The antenna device of claim 3, wherein the second radiating body comprises a director arranged in a direction of the radiator.

8. The antenna device of claim 2, further comprising:
   a third radiating body mounted on a bottom surface of the multiple layer circuit board and electrically connected to the first radiating body,
   wherein the third radiating body is configured to transmit and receive the second polarized wireless signal together with the first radiating body and the second radiating body.

9. The antenna device of claim 2,
   wherein the second radiating body comprises a dielectric material, and
   wherein both end portions of the dielectric material are plated with a metal.

10. The antenna device of claim 2, wherein a portion of the second radiating body extends beyond an edge of the multiple layer circuit board.

11. The antenna device of claim 2, wherein the first radiating body comprises a mesh grid radiating body configured in a via coupling form.

12. The antenna device of claim 1, wherein a polarization type of the first polarized wireless signal is different from a polarization type of the second polarized wireless signal.

13. The antenna device of claim 1, wherein the first polarized wireless signal includes a horizontal polarized wireless signal and the second polarized wireless signal includes a vertical polarized wireless signal.

14. An electronic device comprising:
    at least one first antenna device each including a first radiating body mounted to a first surface of a multiple layer circuit board, the at least one first antenna device configured to transmit and receive a first polarized wireless signal; and
    at least one second antenna device each including a radiating body mounted to two adjacent surfaces of the multiple layer circuit board, wherein the radiating body includes the first radiating body and a second radiating body coupled with the first radiating body, the at least one second antenna device configured to transmit and receive a second polarized wireless signal,
    wherein the at least one first antenna device and the at least one second antenna device are alternately disposed in a horizontal direction of the multiple layer circuit board.

15. The electronic device of claim 14, further comprising:
    a metal housing including a first slot and a second slot,
    wherein the at least one first antenna device is disposed within the first slot and fastened to the metal housing with a dielectric material, and
    wherein the at least one second antenna device is disposed within the second slot and fastened to the metal housing with the dielectric material.

16. An electronic device including a multiple layer printed circuit board including two adjacent surfaces, the two adjacent surfaces including a first surface and a second surface, the electronic device comprising:
    at least one first antenna device each including a first radiating body mounted to the first surface of the multiple layer printed circuit board, the at least one first antenna device configured to transmit and receive a first polarized wireless signal, the first surface including a length shorter than a length of the second surface of the electronic device; and
    at least one second antenna device each including a radiating body mounted to the two adjacent surfaces of the multiple layer printed circuit board, wherein the radiating body includes the first radiating body and a second radiating body coupled with the first radiating body, the at least one second antenna device configured to transmit and receive a second polarized wireless signal.

17. The electronic device of claim 16,
    wherein the first radiating body is mounted to a side surface of the multiple layer printed circuit board, and
    wherein the second radiating body is mounted to a top surface of the multiple layer printed circuit board and is electrically connected to the first radiating body.

18. The electronic device of claim 16, wherein the first radiating body comprises a mesh grid radiating body configured in a via coupling form.

19. An antenna device including a multiple layer printed circuit board including two adjacent surfaces, the two adjacent surfaces including a first surface and a second surface, the antenna device comprising:
    a first radiating body mounted to the first surface of the multiple layer printed circuit board, the first radiating body configured to transmit and receive a first polarized wireless signal, the first surface including a height shorter than a length of the second surface; and a second radiating body mounted to the second surface of the multiple layer printed circuit, the second radiating body configured to transmit and receive a second polarized wireless signal together with the first radiating body.

20. The antenna device of claim 19, wherein the first radiating body is mounted to a side surface of the multiple layer printed circuit board, and wherein the second radiating body is mounted to a top surface of the multiple layer printed circuit board and electrically connected to the first radiating body.

* * * * *